United States Patent [19]

Miyake et al.

[11] Patent Number: 4,983,264

[45] Date of Patent: Jan. 8, 1991

[54] FOUR LAYER CATION EXCHANGE FLUOROPOLYMER MEMBRANE

[75] Inventors: Haruhisa Miyake; Hiroaki Ito; Koji Suzuki; Ryoji Yamada, all of Yokohama, Japan

[73] Assignee: Asahi Glass Company Ltd., Tokyo, Japan

[21] Appl. No.: 173,041

[22] Filed: Mar. 28, 1988

Related U.S. Application Data

[63] Continuation of Ser. No. 828,606, Feb. 12, 1986, abandoned, which is a continuation of Ser. No. 733,876, May 14, 1985, abandoned.

[30] Foreign Application Priority Data

May 18, 1984 [JP] Japan ................................. 59-98565

[51] Int. Cl.$^5$ .............................. C25B 1/14; C01J 5/20
[52] U.S. Cl. ...................................... 204/98; 204/128; 204/252; 204/296; 521/27; 521/28
[58] Field of Search .................... 521/27, 28; 204/25, 204/98, 252, 296

[56] References Cited

U.S. PATENT DOCUMENTS

| | | | |
|---|---|---|---|
| 4,176,215 | 11/1979 | Molner et al. | 54/27 |
| 4,251,333 | 2/1981 | Glass | 204/98 |
| 4,267,364 | 5/1981 | Grot et al. | 521/27 |
| 4,377,137 | 6/1982 | Ezzell | 208/252 |
| 4,401,711 | 8/1983 | Silva et al. | 428/422 |

FOREIGN PATENT DOCUMENTS

| | | |
|---|---|---|
| 0094587 | 11/1983 | European Pat. Off. . |
| 53-92394 | 8/1978 | Japan ..................... 521/27 |
| 2065172 | 6/1981 | United Kingdom . |

OTHER PUBLICATIONS

Patents Abstracts of Japan, vol. 6, No. 239 (C-137) (1117), 26th Nov. '82; & JP-A-57 141 428 (Toyo Soda Kogyo K.K.).
Patents Abstracts of Japan, vol. 6, No. 244 (C-138) (1122), 2nd Dec. '82; & JP-A-57 143 332 (Toyo Soda Kogyo K. K.) 04-09-1982 *whole document*.

*Primary Examiner*—Peter F. Kilkosky
*Attorney, Agent, or Firm*—Oblon, Spivak McClelland, Maier & Neustadt

[57] ABSTRACT

A cation exchange fluoropolymer membrane comprising at least three integrally laminated layers including a main layer made of a perfluorocarbon polymer having carboxylic acid groups as its ion exchange groups with an ion exchange capacity of from 1.4 to 2.0 meq/g dry resin and having a thickness of from 50 to 250 $\mu$m, a sulfonic acid film surface layer formed on one side of said main layer, made of a perfluorocarbon polymer having sulfonic acid groups as its ion exchange groups with an ion exchange capacity of from 0.5 to 1.5 meq/g dry resin and having a thickness of from 5 to 50 m, and a carboxylic acid film surface layer formed on the other side of said main layer, made of a perfluorcarbon polymer having carboxylic acid groups as its ion exchange groups with an ion exchange capacity of from 0.5 to 1.3 meq/g dry resin and having a thickness of from 5 to 50 $\mu$m, said sulfonic acid film surface layer and carboxylic acid film surface layer constituting the outer-most layers, respectively.

19 Claims, No Drawings

FOUR LAYER CATION EXCHANGE FLUOROPOLYMER MEMBRANE

This application is a Continuation of U.S. patent application Ser. No. 06/828,606, filed on Feb. 12, 1986, now abandoned, which is a Continuation of U.S. patent application Ser. No. 733,876, filed May 14, 1985, now abandoned.

The present invention relates to a cation exchange fluoropolymer membrane. More particularly, it relates to a novel multi-layered cation exchange fluoropolymer membrane having a specific multi-layered structure including a main layer of a carboxylic acid-type perfluorocarbon polymer film and being useful particularly as a diaphragm for the electrolysis of sodium chloride for the production of high quality sodium hydroxide and chlorine with low electric resistance and high current efficiency.

As a process for producing sodium hydroxide and chlorine by the electrolysis of sodium chloride, an ion exchange membrane process using cation exchange fluoropolymer membranes as diaphragms, has become attractive in recent years since the process is advantageous over the conventional mercury process or asbestos diaphragm process for the prevention of mercury pollution and the conservation of energy, and for the reason that high quality sodium hydroxide containing no substantial sodium chloride is thereby obtainable. As the cation exchange fluoropolymer membrane to be used for such an ion exchange membrane process, a carboxylic acid type membrane is said to be advantageous since sodium hydroxide can thereby be obtained in a high concentration at high current efficiency. On the other hand, it has been pointed out that the carboxylic acid type fluoropolymer membrane has a problem that when compared with the sulfonic acid type fluoropolymer membrane, it has a greater electric resistance.

Heretofore, there have been various proposals with an aim to solve the above-mentioned problems with respect to cation exchange fluoropolymer membranes as diaphragms for the electrolysis of sodium chloride. For instance, Japanese Unexamined Patent Publication No. 120492/1975 discloses a cation exchange membrane obtained by the copolymerization of a carboxylic acid type monomer with a sulfonic acid type monomer and the one obtained by the copolymerization of a carboxylic acid type monomer with a sulfonic acid type monomer and the one obtained by impregnating a sulfonic acid type fluoropolymer membrane with a carboxylic acid type monomer, followed by polymerization, as cation exchange membranes made of a perfluorocarbon polymer having both carboxylic acid groups and sulfonic acid groups. These cation exchange membranes are said to provide high current efficiency and high electric conductivity attributable to sulfonic acid groups having high electric conductivity in addition to the characteristics of carboxylic acid groups. Further, Japanese Unexamined Patent Publication No. 36589/1977 discloses a membrane made of a blend comprising a carboxylic acid type perfluorocarbon polymer and a sulfonic acid type perfluorocarbon polymer, and a laminated membrane comprising a carboxylic acid type membrane and a sulfonic acid type membrane. These membranes are said to overcome the difficulty of the sulfonic acid type membrane in the production of sodium hydroxide in a high concentration at high current efficiency, by the lamination of the carboxylic acid type membrane or by the blending with a carboxylic acid type polymer.

Further, there have been a number of various proposals for the purpose of improving the inadequate electrolytic properties of a sulfonic acid type membrane. For instance, there may be mentioned a method wherein the surface of the membrane made of a perfluorocarbon polymer having sulfonic acid groups, is subjected to reducing treatment and/or oxidizing treatment, thereby to chemically convert the sulfonic acid groups to carboxylic acid groups and to form a carboxylic acid type thin layer on the surface of the sulfonic acid type membrane (Japanese Unexamined Patent Publications No. 24175/1977, No. 24176/1977, No. 24177/1977, No. 53814/1977, No. 132069/1978 and No. 132094/1978), and a method wherein a membrane of a blend comprising a sulfonic acid group-containing polymer and a carboxylic acid group-containing polymer, is laminated on a sulfonic acid group membrane (U.S. Pat. Nos. 4,176,215 and 4,255,250, and Japanese Unexamined Patent Publications No. 92026/1982 and No. 99234/1981), a method wherein a membrane comprising at least three layers including a sulfonic acid group layer/a carboxylic acid group layer/a sulfonic acid group, phosphoric acid group or sulfonic amide group layer is obtained by a chemical conversion method (Japanese Examined Patent Publication No. 9589/1982), a method wherein at least two layers of weakly acidic groups such as carboxylic acid groups or acid amide groups are laminated on a main layer of a sulfonic acid membrane having a thickness of at least one half of the entire thickness (japanese Unexamined Patent Publication No. 50470/1980, and a method wherein a layer of weakly acidic groups is laminated on a sulfonic acid type membrane composed of at least two layers having different equivalent weights (Japanese Unexamined Patent Publication No. 58228/1980).

As described above, the majority of many multi-layer type cation exchange fluoropolymer membranes so far proposed have a sulfonic acid type perfluorocarbon polymer film as the main layer to improve over the difficulty of the sulfonic acid type membrane.

On the other hand, in a multi-layer type cation exchange fluoropolymer membrane represented by a laminated structure comprising a sulfonic acid type film and a carboxylic acid type film, the difference in the swelling of the sulfonic acid layer and the carboxylic acid layer is substantial, and accordingly such a cation exchange membrane is said to have a difficulty that it tends to be defective due to the peeling of the layers. Various methods have been proposed to solve such a difficulty. For instance, Japanese Unexamined Patent Publication 25332/1982 and above-mentioned Japanese Unexamined Patent Publication No. 58228/1980 disclose a method of minimizing the difference of the equivalent weights of the two layers. Japanese unexamined Patent Publications No. 14332/1982, No. 141428/1982 and No. 92025/1982 disclose a method wherein a laminated structure is formed by using, as an intermediate layer between the sulfonic acid film layer and a carboxylic acid film layer a layer of copolymer of a sulfonic acid type monomer with a carboxylic acid type monomer, or a layer in which sulfonic acid groups and carboxylic acid groups are present in a mixed state.

Further, Japanese Unexamined Patent Publications No. 78422/1982 and No. 80430/1982 disclose a multilayer type membrane for use with an carboxylic acid film layer facing the cathode compartment side, in which a layer having a minimum difference in swelling is laminated on the anode compartment side. Namely, in order to reduce the swelling of the film facing the anode compartment side, a film layer of a copolymer of a carboxylic aid type monomer with a sulfonic acid type monomer, or a film layer of a blend of a carboxylic acid type perfluorocarbon polymer and a sulfonic acid type perfluorocarbon polymer, is laminated on the side of a carboxylic acid type film facing the anode compartment side. These multi-layer type membranes are common to the above-mentioned Japanese Unexamined Patent Publications No. 92025/1982, No. 141428/1982 and No. 143332/1982 and U.S. Pat. Nos. 4,176,215 and No. 4,255,240 and Japanese Unexamined Patent Publications No. 99234/1981 and No. 92026/1982 in that they are intended to reduce the difference in swelling as between the sulfonic acid layer and the carboxylic acid layer.

The present inventors have conducted various researches and studies on the multi-layer type membranes, and have found the following facts. Namely, firstly, the carboxylic acid type perfluorocarbon polymer membrane may be comparable to the sulfonic acid type membrane in the electric resistance if its ion exchange capacity is selected within a specific range, and if the comparison is made at the same electric resistance level, the carboxylic acid type membrane is rather superior to the sulfonic acid type membrane in the mechanical strength. Not only that, it is also advantageous that sodium hydroxide can thereby be obtained in a high concentration at high current efficiency, as has been known before.

Secondly, the carboxylic acid type membrane has a small water content in the membrane as compared with the sulfonic acid type membrane, i.e. the swelling is small, whereby it is advantageous not only from the current efficiency, but also from the superiority in suppressing the leakage of sodium chloride from the anode compartment.

Thirdly, the carboxylic acid type membrane is advantageous as the main layer for a multi-layer type membrane for supporting or carrying other layers by virtue of the small swelling property. Namely, with the conventional multi-layer type membranes using a sulfonic acid type membrane as the main layer, there is certain restrictions to the layer supported thereon, since the main layer has a substantial swelling property. Whereas, when a carboxylic acid type membrane is used as the main layer, such restrictions may be minimized, whereby various layers can be supported relatively freely. Thus, a sulfonic acid film surface layer capable of being ionized even in an acidic range, can readily be formed as a thin film layer facing the anode compartment on the side of the carboxylic acid type film main layer. Of course, in order to adequately prevent the reduction of current efficiency due to reversed diffusion of OH ions from the cathode compartment, it is readily possible to form a carboxylic acid film surface layer having a small ion exchange capacity, as a thin film layer, on the side of the carboxylic acid type film main layer facing the cathode compartment.

Fourthly, in a multi-layer type membrane, it is extremely advantageous for a cation exchange fluoropolymer membrane used for the production of high quality sodium hydroxide and chlorine at high current efficiency, to form a carboxylic acid film surface layer effective for attaining a high current efficiency on the side facing the cathode compartment, and a sulfonic acid film surface layer having better flexibility against the pH value on the side facing the anode compartment, both in the form of thin film layers.

The present invention has been accomplished on the basis of the above discoveries. Namely, the present invention provides a cation exchange fluoropolymer membrane comprising at least three integrally laminated layers including a main layer made of a perfluorocarbon polymer having carboxylic acid groups as its ion exchange groups with an ion exchange capacity of from 1.4 to 2.0 meq/g dry resin and having a thickness of from 50 to 250 $\mu$m, a sulfonic acid film surface layer formed on one side of said main layer, made of a perfluorocarbon polymer having sulfonic acid groups as its ion exchange groups with an ion exchange capacity of from 0.5 to 1.5 meq/g dry resin and having a thickness of from 5 to 50 $\mu$m, and a carboxylic acid film surface layer formed on the other side of said main layer, made of a perfluorocarbon polymer having carboxylic acid groups as its ion exchange groups with an ion exchange capacity of from 0.5 to 1.3 meq/g dry resin and having a thickness of from 5 to 50 $\mu$m, said sulfonic acid film surface layer and carboxylic acid film surface layer constituting the outer-most layers, respectively.

The multi-layer type membrane having a novel structure of the present invention can be used as a diaphragm for the electrolysis of sodium chloride for the production of high quality sodium hydroxide and chlorine with low resistance and at high current efficiency by the employment of the main layer of specific carboxylic acid film. Yet, by the employment of the specific carboxylic acid film surface layer and the sulfonic acid film surface layer, coupled with the combination with the above-mentioned main layer of a carboxylic acid film, the above-mentioned effectiveness is further advantageously be attained. The multi-layer type membrane of the present invention is advantageously used for the production of sodium hydroxide in a high concentration at high current efficiency.

Further, in spite of the use of the main layer of a carboxylic acid film, the membrane of the present invention exhibits low resistance comparable to a sulfonic acid type membrane or conventional multi-layer membranes comprising the main layer of a sulfonic acid film.

Further, the multi-layer type membrane of the present invention effectively suppresses the leakage of sodium chloride from the anode compartment, as compared with a sulfonic acid type membrane. As a result, it is possible to obtain sodium hydroxide having an extremely low NaCl content from the cathode compartment.

The effects such as the high current efficiency, low resistance and low NaCl content are stable for a long period of time and can certainly be accomplished by the multi-layer type membrane of the present invention. The multi-layer type membrane of the present invention is advantageous in view of the durability.

Furthermore, even when the anode compartment becomes to have a low pH, the multi-layer type membrane of the present invention exhibits its effects certainly and constantly when disposed so that the sulfonic acid film surface layer faces the anode compartment side. Accordingly, it can also be advantageously used when e.g. hydrochloric acid is added to the anode compartment to reduce the amount of oxygen formed as a by-product in the anode compartment due to OH ions reversely diffused from the cathode compartment. Thus, the multi-layer type membrane of the present invention exhibits its effects for the production of chlorine having a minimum oxygen concentration.

According to the present invention, the main layer of a specific carboxylic acid film is employed, which is extremely advantageous for the formation of the carboxylic acid film surface layer, and which also serves advantageously for the formation of the sulfonic acid film surface layer. When the main layer of carboxylic acid film and the sulfonic acid film surface layer are integrally laminated with a composite layer having carboxylic acid groups and sulfonic acid groups interposed between them in order to ensure the bondage between the main layer and the sulfonic acid film surface layer, a still better result is obtainable.

In the multi-layer type membrane of the present invention, it is important to use the main layer of a carboxylic acid film. The main layer is made of a perfluorocarbon polymer having carboxylic acid groups as its ion exchange groups. The ion exchange capacity of the carboxylic acid groups is from 1.4 to 2.0 meq/g dry resin, preferably from 1.4 to 1.9 meq/g dry resin. The main layer has a thickness of from 50 to 250 μm, preferably from 100 to 200 μm. If the ion exchange capacity of the main layer is too small, the reduction of the electric resistance will be inadequate. On the other hand, if the ion exchange capacity is excessive, the swelling tends to increase, whereby not only the mechanical strength will be inadequate, but also the prevention of the reverse diffusion of OH ions and the prevention of the leakage of sodium chloride will be inadequate. If the thickness of the main layer is too small, there will be disadvantages in respect of the strength and the prevention of the reverse diffusion or leakage. On the other hand, if the thickness is excessive, there will be a disadvantage in accomplishing the low electric resistance. Thus, the thickness of the main layer is preferably at least ½ of the total thickness of the membrane.

The carboxylic acid film surface layer is made of a perfluorocarbon polymer having carboxylic acid groups as its ion exchange groups, like the above-mentioned main layer. The ion exchange capacity of the carboxylic acid film surface layer is selected within a range smaller than the ion exchange capacity of the above-mentioned main layer, and is usually from 0.5 to 1.3 meq/g dry resin, preferably from 0.8 to 1.3 meq/g dry resin. The thickness of the carboxylic acid film surface layer is selected within a range smaller than the thickness of the above-mentioned main layer, and is usually from 5 to 50 || m, preferably from 10 to 40 μm. If the ion exchange capacity of the carboxylic acid film surface layer is too small or if the thickness is excessive, there will be a disadvantage in achieving the low electric resistance. On the other hand, if the ion exchange capacity of the carboxylic acid film surface layer is excessive or greater than that of the main layer, or if the thickness is too small, no adequate effectiveness will be obtained for the prevention of the reverse diffusion of OH ions. In the present invention, the carboxylic acid film main layer and the carboxylic acid film surface layer may be laminated with a carboxylic acid film intermediate layer interposed therebetween and having an ion exchange capacity of an intermediate level between the ion exchange capacities of the two layers.

In the present invention, the sulfonic acid film surface layer is made of a perfluorocarbon polymer having sulfonic acid groups as ion exchange groups. The ion exchange capacity of the sulfonic acid groups is from 0.5 to 1.5 meq/g dry resin, preferably from 0.8 to 1.3 meq/g dry resin. The thickness of the sulfonic acid film surface layer is selected within a range smaller than the thickness of the above-mentioned carboxylic acid film main layer, and is usually from 5 to 50 μm, preferably from 10 40 μm. The sulfonic acid film surface layer is intended to impart better flexibility to the pH, and is not required to be so thick. If the ion exchange capacity of the sulfonic acid film surface layer is too small, there will be a disadvantage in achieving the low electric resistance. On the other hand, if the ion exchange capacity is excessive, the difference in the swelling from the carboxylic acid film main layer tends to increase, whereby there will be a problem of the peeling of the layers.

The multi-layer type membrane of the present invention comprises at least three layers, wherein the above-mentioned sulfonic acid film surface layer and the carboxylic acid film surface layer are integrally laminated on the above-mentioned carboxylic acid film main layer so that the sulfonic acid film surface layer and the carboxylic acid film surface layer constitute the outer-most layers, respectively. In a preferred embodiment of the present invention, the carboxylic acid film main layer and the sulfonic acid film surface layer are integrally laminated with a composite layer of a perfluorocarbon polymer interposed therebetween and having both carboxylic acid groups and sulfonic acid groups to ensure the bondage between the carboxylic acid film main layer and the sulfonic acid film surface layer.

In the present invention, as the composite film layer to be used as an intermediate layer between the carboxylic acid film main layer and the sulfonic acid film surface layer, it is important from its purpose that the sulfonic acid groups and carboxylic acid groups are dispersed in a mixed state throughout the entire composite film layer. Namely, such a composite layer may be made of a copolymer obtained by the copolymerization of the carboxylic acid type monomer and the sulfonic acid type monomer. However, usually it is advantageous to employ a composite layer made of a blend comprising a carboxylic acid type perfluorocarbon polymer and a sulfonic acid type perfluorocarbon polymer wherein the sulfonic acid groups and carboxylic acid groups are present in a mixed state. In the case of using the blend composite film layer, it is convenient to employ for the respective constituent polymers, the one constituting the carboxylic acid film main layer and the one constituting the sulfonic acid film surface layer. However, of course, other carboxylic acid type perfluorocarbonpolymer polymer and sulfonic acid type perfluorocarbon polymer may optionally be employed.

The composite layer may not be so thick from its purpose as an intermediate layer, and the thickness may be very thin. For instance, it is possible to form a mixed layer in such a manner that at the time of laminating the carboxylic acid film main layer and the sulfonic acid film surface layer, a sulfonic acid type perfluorocarbon polymer or a carboxylic acid type perfluorocarbon polymer, or a mixture of these polymers is applied in a powder state on the laminating surface to form a thin layer, and fusing it by means of e.g. heat pressing. In such a manner, the applied polymer powder will be compatibly fused with the main layer and/or the surface layer at the interface for lamination, and a mixed layer having an extremely thin thickness will be formed, whereby the purpose of improving the bondage will be accomplished.

The thickness of the composite layer is usually from 5 to 50 μm, preferably from 10 to 40 μm. In a preferred embodiment, a blend composite film layer is formed into a film having a predetermined thickness, and the carboxylic acid film main layer and the sulfonic acid film surface layer are integrally laminated with such a film interposed between them. The ion exchange capacity of the composite layer is not critical so long as it is adequate for accomplishing the low electric resistance and it has adequate mechanical strength as the intermediate layer for bondage. Thus, the ion exchange capacity of the composite film layer may be selected within a wide range, and is usually selected to be at least comparable to the electric resistance of the carboxylic acid film main layer.

In the case of employing the blend composite film layer, the mixing ratio of the carboxylic acid type perfluorocarbon polymer and the sulfonic acid type perfluorocarbon polymer may vary within a wide range. Usually, however, from 25 to 400 parts by weight, preferably from 50 to 150 parts by weight of the sulfonic acid type polymer is mixed with 100 parts by weight of the carboxylic acid type polymer.

In the present invention, the carboxylic acid type perfluorocarbon polymer and the sulfonic acid type perfluorocarbon polymer constituting the above-mentioned respective layers, are not particularly restricted to those known or well-known in the art, and any types may be employed so long as they satisfy the above-mentioned specific requirements. According to a preferred embodiment, it is particularly preferred to employ a polymer having the following structures (i) and (ii):

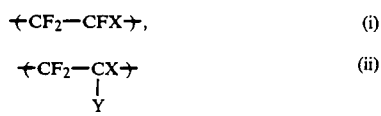

where X is F or —CF$_3$, preferably F, and Y is selected from the following groups:

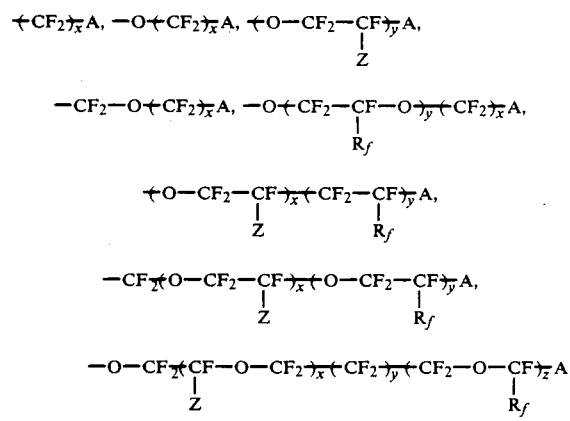

where each of x, y and z is from 0 to 10, and each of Z and R$_f$ is selected from the group consisting of —F or a perfluoroalkyl group having from 1 to 10 carbon atoms. Further, A is —SO$_3$M or —COOM, or a group which can be converted to such groups by hydrolysis, such as —SO$_2$F, —CN, —COF or —COOR, where M is a hydrogen atom or an alkali metal, and R is an alkyl group having from 1 to 10 carbon atoms.

The multi-layer type membrane of the present invention has a total thickness of from 60 to 350 μm, preferably from 100 to 300 μm, and if required, it may be reinforced by a woven fabric such as a cloth or a net, or a non-woven fabric, preferably made of e.g. polytetrafluoroethylene, or by a metallic mesh or perforated sheet as disclosed in U.S. Pat. Nos. 4,021,327 and 4,437,951. Otherwise, the membrane of the present invention may be reinforced by blending fibrillated fibers of polytetrafluoroethylene as disclosed in e.g. Japanese Unexamined Patent Publications No. 149881/1978, No. 1283/1979, No. 107479/1979 and No. 157777/1979, or by blending fibrillated fibers of polytetrafluoroethylene modified by the copolymerization with a small amount of an acid type functional group-containing monomer, as disclosed in e.g. Japanese Unexamined Patent Publication No. 79110/1981. Further, it is possible to employ reinforcement by blending other low molecular polymers. Further, the multi-layer type membrane of the present invention may be modified by roughening its surface, or by forming a porous thin layer composed of metal oxide particles on its surface as disclosed in European Patent Publication No.29751. When the above-mentioned various reinforcing means are to be employed in the present invention, it is preferred to apply them to the carboxylic acid film main layer.

In the present invention, the film-forming for each layer or the mixing for the preparation of the blend composite film layer may be conducted by various conventional methods. For instance, the mixing may be conducted in a wet system by using an aqueous dispersion, an organic solution or an organic dispersion of an ion exchange group-containing perfluorocarbon polymer. The film forming can be conducted by a casting method by using such an organic solution or organic dispersion. Of course, the dry blending system may be employed, or the film formation may be conducted by a heat melting molding method. When a film for each layer is formed by the heat melting molding method, the ion exchange groups of the starting polymer should take a suitable form not to lead to decomposition thereof. For instance, in the case of carboxylic acid groups, they should preferably take a form of an acid or an ester, and in the case of sulfonic acid groups, they should preferably take a form of —SO$_2$F. Alternatively, the starting material polymer may firstly be pelletized by heat melting molding, and then molded by extrusion or press molding into a film.

The multi-layer type membrane of the present invention is usually prepared in such a manner that the carboxylic acid film main layer, the sulfonic acid film surface layer, the carboxylic acid film surface layer and, if required, the composite film layer or the carboxylic acid film intermediate layer, are respectively separately prepared in the form of predetermined films, and they are laminated integrally. As the method for the integral lamination of the layers, there may be mentioned flap plate pressing or roll pressing. The temperature for pressing is usually from 60 to 280° C., and the pressure is from 0.1 to 100 kg/cm$^2$ by the flat plate pressing and form 1 to 100 kg/cm by roll pressing.

The multi-layer type membrane of the present invention may be used in a wide range in various electrolyses. In such a case, any type of electrodes may be used. For instance, there may be employed perforated electrodes such as foraminous plates, nets, punched metals, or expanded metals. As the perforated electrode, there may be mentioned an expanded metal having openings with a long opening diameter of from 1.0 to 10 mm and short opening diameter of from 0.5 to 10 mm, the wire diameter of from 0.1 to 1.3 mm and an opening rate of from 30 to 90%. Further, a plurality of plate-like electrodes may also be used. It is particularly preferred to use a plurality of electrodes having different opening rates, wherein electrodes having smaller opening rates are disposed close to the membrane.

The anode may usually be made of a platinum group metal or its electro-conductive oxides or electro-conductive reduced oxides. On the other hand, the cathode may be made of a platinum group metal, its electro-conductive oxides or an iron group metal. As the platinum group metal, there may be mentioned platinum, rhodium, ruthenium, palladium and iridium. As the iron group metal, there may be mentioned iron, cobalt, nickel, Raney nickel, stabilized Raney nickel, stainless steel, an alkali etching stainless steel (U.S. Pat. No. 4,255,247), Raney nickel-plated cathode (U.S. Pat. Nos. 4,170,536 and 4,116,804) and Rodan nickel-plated cathode (U.S. Pat. Nos. 4,190,514 and 4,190,516).

In the case where perforated electrodes are used, the electrodes may be made of the above-mentioned materials for the anode or cathode. However, when a platinum group metal or its electro-conductive oxides are used, it is preferred to coat these substances, on the surface of an expanded metal made of a valve metal such as titanium or tantalum.

When an electrode is to be installed, it may be disposed in contact with the multi-layer type membrane of the present invention, or may be disposed with a space from the membrane. The electrode should be pressed gently rather than firmly against the membrane surface. For instance, the electrode is preferably gently pressed under pressure of from 0 to 2.0 kg/cm² against the ion exchange membrane surface.

The electrolytic cell in which the multi-layer type membrane of the present invention is used, may be a monopolar type or bipolar type. With respect to the material constituting the electrolytic cell, for instance, in the case of he anode compartment for the electrolysis of an aqueous alkali metal chloride solution, a material resistant to an aqueous alkali metal chloride solution and chlorine, such as a valve metal like titanium, may be used, and in the case of the cathode compartment, iron, stainless steel or nickel resistant to an alkali hydroxide and hydrogen, may be used.

The electrolysis of an aqueous alkali metal chloride solution by using the multi-layer type membrane of the present invention, maybe conducted under conventional conditions. For instance, the electrolysis is conducted preferably at a temperature of from 80 to 120° C. at a current density of from 10 to 100 A/dm² while supplying preferably a 2.5–5.0 N alkali metal chloride aqueous solution to the anode compartment and water or diluted alkali metal hydroxide to the cathode compartment. In such a case, it is preferred to minimize the presence of heavy metal ions such as calcium or magnesium in the aqueous alkali metal chloride solution, since such heavy metal ions bring about a deterioration of the ion exchange membrane. Further, in order to prevent as far as possible the generation of oxygen at the anode, an acid such as hydrochloric acid may be added to the aqueous alkali metal chloride solution.

In the foregoing, the use of the multi-layer type membrane of the present invention has been described primarily with respect to the electrolysis of an aqueous alkali metal chloride solution particularly sodium chloride solution. However, it should be understood that the membrane of the present invention is likewise applicable to the electrolysis of water, a halogen acid (hydrochloric acid or hydrobromic acid) or an alkali metal carbonate. Further, it may be used as a diaphragm for various electrolytic synthetic reactions of organic compounds wherein ion exchange membranes are used.

Now, the present invention will be described in further detail with reference to Examples. However, it should be understood that the present invention is by no means restricted by these specific Examples. In the Examples, "parts" means "parts by weight " unless otherwise specified.

EXAMPLE 1

Into a 0.2 liter stainless steel reactor, 22 g of trichlorotrifluoroethane, 78 g of

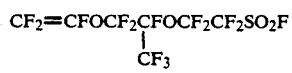

and 0.1 g of azobisisobutyronitrile were charged. After thoroughly deaerating with liquid nitrogen, the temperature was raised to 70° C., and tetrafluoroethylene was charged to a pressure of 12.3 kg/cm² to start the reaction. During the reaction, tetrafluoroethylene was continuously introduced to maintain the pressure at such constant level of 12.3 kg/cm². Seven hours later, 14.5 g of a copolymer was obtained, and it had an ion exchange capacity of 1.1 meq/g. This copolymer was designated as A.

Then into a 0.2 liter stainless steel reactor, 100 g of deionized water, 0.2 g of $C_8F_{17}COONH_4$, 0.50 g of $Na_2HPO_4.12H_2O$, 0.29 g of $NaH_2PO_4.2H_2O$, 0.079 g of $(NH_4)_2S_2O_8$ and 0.02 g of $NaHSO_4$ were charged, and then 30 g of $CF_2=CFO(CF_2)_3COOCH_3$ was charged. After thoroughly deaerating with liquid nitrogen, the temperature was raised to 40° C., and tetrafluoroethylene was introduced to a pressure of 5.1 kg/cm² to conduct the reaction. During the reaction, tetrafluoroethylene was continuously introduced to maintain the pressure at such constant level. 7.5 Hours later, the reaction was terminated, and the obtained latex was floccurated, washed with water and then treated in methanol at 65° C. for 16 hours, whereby 23.4 g of a copolymer was obtained. The ion exchange capacity was 1.80 meq/g. This copolymer was designated as B.

Then, into a 0.2 liter stainless steel reactor, 100 g of deionized water, 0.2 g of $C_8F_{17}COONH_4$, 0.49 g of $NaH_2PO_4.2H_2O$, 0.052 g of $(NH_4)_2S_2O_8$, 0.03 g of n-hexane and 20 g of $CF_2=CFO(CF_2)_3COOCH_3$ were charged, and reacted with tetrafluoroethylene under a polymerization pressure of 13.5 kg/cm² at 57° C., whereby 20 g of a copolymer was obtained. The ion exchange capacity was 1.17 meq/g. This copolymer was designated as C.

Copolymer A was press-molded at 230° C. to obtain a film having a thickness of 30 μm. This film was designated as D. Then, copolymer B was press-molded at 230° C. to obtain a film having a thickness of 160 μm. This film was designated as E. Then, copolymer A and copolymer B were blended at a ratio of 1:1, then roll-kneaded at 130° C., and press-molded at 230° C. to obtain a film having a thickness of 15 μm. This film was designated as F. Further, copolymer C was press-molded at 230° C. to obtain a film having a thickness of 30 μm. This film was designated as G.

Then, the films were placed one after another in the order of D, F, E and G and laminated at 200° C. by means of heat rolls. The membrane thus obtained was hydrolyzed at 65° C. for 16 hours in a 25% sodium hydroxide aqueous solution to obtain a sodium type ion exchange membrane.

To the D layer side of the membrane thus obtained, an anode prepared by containing a solid solution of ruthenium oxide, iridium oxide and titanium oxide on a titanium punched metal (short opening odiameter: 2 mm, long opening diameter: 5 mm) and having a low chlorine overvoltage, was pressed to be in contact with the membrane. Likewise, to the G layer side of the membrane, a cathode prepared by electrodepositing a ruthenium-containing Raney nickel (ruthenium: 5%, nickel: 50%, aluminium: 45%) on a SUS 304 punched metal (short opening diameter: 2 mm, long opening diameter: 5 mm) and having a low hydrogen overvoltage, was pressed to be in contact with the membrane. Then, electrolysis was conducted at 90° C. at a current density of 30 A/dm$^2$, while supplying a 5N sodium chloride aqueous solution to the anode compartment and water to the cathode compartment, and maintaining the sodium chloride concentration in the anode compartment to a level of 3.5 N and the sodium hydroxide concentration in the cathode compartment to a level of 35% by weight.

As the results, the current efficiency was 96.5%, and the cell voltage was 3.14 V. The sodium chloride content in the formed sodium hydroxide solution was 27 ppm. The membrane used for the electrolysis for 10 days was examined, and no abnormality was observed.

EXAMPLE 2

In the same manner as in Example 1, the films were placed one after another in the order of D, F, E and G and laminated at 200° C. by means of heat rolls. On the other hand, a mixture comprising 10 parts of zirconium oxide powder having a particle size of 5 μm, 0.2 part of methyl cellulose (viscosity of 2% aqueous solution: 1500 centipoise), 19 parts of water, 2 parts of cyclohexanol and 1 part of cyclohexanone, was kneaded to obtain a paste. The paste was screen-printed on the D layer side of the ion exchange membrane prepared by the above lamination, with use of a Tetraon screen having 200 mesh and a thickness of 75 μm, a printing plate provided with a screen mask having a thickness of 30 μm beneath the screen and a squeegee made of polyurethane. The printed layer on the membrane surface was dried in air.

Then, on the other side of the membrane having a porous layer thus obtained, α-silicon carbide particles having an average particle size of 0.3 μm were deposited. Thereafter, the particle layers on the respective membrane surfaces were press-fixed to the ion exchange membrane surfaces at a temperature of 140° C. under a pressure of 30 kg/cm$^2$, to obtain an ion exchange membrane with zirconium oxide particles and silicon carbide particles deposited in an amount of 1.0 mg/cm$^2$ and 0.7 mg/cm$^2$ respectively on the anode side and the cathode side of the membrane. The ion exchange membrane thus obtained was hydrolyzed and used for the electrolysis under the same conditions as disclosed in Example 1, whereby the following results were obtained.

Current density (A/dm$^2$): 30
Cell voltage (V): 2.90
Current efficiency (%): 96.0

The sodium chloride content in the formed sodium hydroxide solution was 25 ppm.

The membrane used for the electrolysis for 30 days was examined, and no abnormality was observed in the membrane.

EXAMPLE 3

To a substrate obtained by forming grooves with a pitch of 0.5 mm width on one side of a titanium punched metal (short opening diameter: 2 mm, long opening diameter: 5 mm), the same treatment as in Example 1 was applied, to obtain a grooved anode. Then, electrolysis was conducted under the same conditions as in Example 2 except that the grooved side of the anode was pressed against the zirconium oxide porous layer side of the ion exchange membrane obtained in the same manner as in Example 2, and the electrolysis was conducted while adding hydrochloric acid to 5 N sodium chloride and maintaining the pH of the brine at a level of 1.5.

As the results, the current efficiency was 96.0%, the cell voltage was 2.90 V, and the oxygen concentration in the chlorine gas obtained at the anode was 0.3%. The sodium chloride content in the formed sodium hydroxide solution was 22 ppm. The membrane used for the electrolysis for 180 days was examined, and no abnormality was observed in the membrane.

EXAMPLE 4

The preparation of the membrane and the hydrolysis were conducted under the same condition as in Example 1 except that a film I having a thickness of 140 μm and prepared from copolymer H Of $CF_2=CF_2$ and $CF_2=CFO(CF_2)_3COOCH_3$ having an ion exchange capacity of 1.54 meq/g and obtained under the same polymerization condition as in the preparation of copolymer B, instead of copolymer B, was employed, and a film J having a thickness of 15 μm obtained from a 1:1 blend of the copolymers H and A, was used instead of F, whereby the following results were obtained.

Current density (A/dm$^2$) 30
Cell voltage (V): 3.14
Current efficiency (%): 96.8

The sodium chloride content in the formed sodium hydroxide solution was 21 ppm.

EXAMPLE 5

The preparation of the membrane and the electrolysis were conducted under the same conditions as in Example 1 except that a film L having a thickness of 20 μm prepared from copolymer K of $CF_2=CF_2$ and $CF_2=CFOCF_2CF(CF_3)PCF_2CF_2SO_2F$, instead of copolymer having an ion exchange capacity of 0.9 meq/g and obtained under the same polymerization condition as in the preparation of copolymer A was used, and a film M having a thickness of 10 μm obtained from a 1:1 blend of copolymers K and B was used instead of F, whereby the following results were obtained.

Current density (A/dm$^2$): 30
Cell voltage (V): 3.15
Current efficiency (%): 96.8

The sodium chloride content in the formed sodium hydroxide solution was 27 ppm.

EXAMPLE 6

The preparation of the membrane and the electrolysis were conducted under the same conditions as in Example 1 except that instead of the film E having a thickness of 160 μm, a film E' having the same composition and a thickness of 140 μm was employed, and instead of the film G having a thickness of 30 μm, a film G' having the same composition and a thickness of 20 μm was employed, whereby the following results were obtained.

Current density (A/dm$^2$): 30
Cell voltage (V): 3.22
Current efficiency (%): 96.5

The sodium chloride content in the formed sodium hydroxide solution was 36 ppm.

EXAMPLE 7

In example 2, a reinforcing cloth was incorporated to reinforce the membrane. As the reinforcing cloth, there was used a plain cloth having a thickness of 70 μm (aspect ratio: 1.5) prepared by plain weaving 75 denier polytetrafluoroethylene yarns (27 yarns/inch) and 30 denier polyester yarns (54 yarns/inch), followed by flattening. This reinforcing cloth was inserted into the membrane in such a manner that in Example 2, it was placed on the film A side of the membrane, prior to the deposition of the zirconium oxide and silicon carbide particle layers, and heated at 200° C. and pressed.

By using the ion exchange membrane thus obtained, the electrolysis of an aqueous sodium chloride solution was conducted in the same manner as in Example 2, whereby substantially the same results as in Example 2 were obtained except that the cell voltage was 2.93 volt.

We claim:

1. A cation exchange fluoropolymer membrane of high mechanical strength, having integrally laminated layers, consisting essentially of:
   (a) a main layer made of a perfluorocarbon polymer having carboxylic acid groups as ion exchange groups therefor with an ion exchange capacity of from 1.4 to 2.0 meq/g dry resin and having a thickness of from 50 to 250 μm;
   (b) a sulfonic acid film surface layer formed on one side of said main layer, made of a perfluorocarbon polymer having sulfonic acid groups as ion exchange groups therefor with an ion exchange capacity of from 0.5 to 1.5 meq/g dry resin and having a thickness of from 5 to 50 μm;
   (c) a carboxylic acid film surface layer formed on the other side of said main layer, made of a perfluorocarbon polymer having carboxylic acid groups as ion exchange groups therefor with an ion exchange capacity of from 0.5 to 1.3 meq/g dry resin and having a thickness of from 5 to 50 μm, said sulfonic acid film surface layer and carboxylic acid film surface layer constituting the outer-most layers, respectively; and
   (d) a composite film layer between said main layer and said sulfonic acid film surface layer, which integrally laminates said layers, said composite film layer being made of a perfluorocarbon polymer having both carboxylic acid and sulfonic acid groups and having a thickness of from 5 to 50 μm.

2. The cation exchange fluoropolymer membrane according to claim 1, wherein the composite film layer is made of a blend comprising a perfluorocarbon polymer having carboxylic acid groups as its ion exchange groups and a perfluorocarbon polynmer having sulfonic acid groups as its ion exchange groups.

3. The cation exchange fluoropolymer membrane according to claim 1, wherein the composite film layer is made of a blend comprising a perfluorocarbon polymer constituting the main layer and a perfluorocarbon polymer constituting the sulfonic acid film surface layer.

4. The cation exchange fluoropolymer membrane according to claim 1, wherein the composite film layer is made of a blend comprising 100 parts by weight of a perfluorocarbon polymer having carboxylic groups as its ion exchange groups and from 25 to 400 parts by weight of a perfluorocarbon polymer having sulfonic acid groups as its ion exchange groups.

5. An electrolytic cell having high current efficiency, which comprises anode and cathode compartments partitioned by a cation exchange fluoropolymer membrane of high mechanical strength, having integrally laminated layers, consisting essentially of:
   (a) a main layer made of a perfluorocarbon polymer having carboxylic acid groups as ion exchange groups therefor with an ion exchange capacity of from 1.4 to 2.0 meq/g dry resin and having a thickness of from 50 to 250 μm.
   (b) a sulfonic acid film surface layer formed on one side of said main layer, made of a perfluorocarbon polymer having sulfonic acid groups as ion exchange groups therefor with an ion exchange capacity of from 0.5 to 1.5 meq/g dry resin and having a thickness of from 5 to 50 μm,
   (c) a carboxylic acid film surface layer formed on the other side of said main layer, made of a perfluorocarbon polymer having carboxylic acid groups as ion exchange groups therefor with an ion exchange capacity of from 0.5 to 1.3 meq/g dry resin and having a thickness of from 5 to 50 μm, said sulfonic acid film surface layer and carboxylic acid film surface layer constituting the outer-most layers, respectively, and
   (d) a composite film layer between said main layer and said sulfonic acid film surface layer, to integrally laminate said layers, said composite film layer being made of a perfluorocarbon polymer having both carboxylic acid and sulfonic acid groups and having a thickness of from 5 to 50 μm.

6. The electrolytic cell according to claim 5, wherein the cation exchange fluoropolymer membrane is disposed so that the carboxylic acid film surface layer faces the cathode and the sulfonic acid film surface layer faces the anode.

7. The electrolytic cell according to claim 6, wherein an aqueous alkali metal chloride solution is electrolyzed to obtain an alkali metal hydroxide and chlorine.

8. An electrolytic process for the production of an alkali hydroxide an chlorine by the electrolysis of an alkali chloride, said produced alkali hydroxide having a low content of alkali chloride therein, which comprises electrolyzing an aqueous alkali metal chloride solution in an electrolytic cell at a temperature of from 80 to 120° C. and at a current density of from 10 to 100 A/dm$^2$, while supplying a 2.5–5.0 N alkali metal chloride aqueous solution to the anode compartment and water or dilute alkali metal hydroxide aqueous solution to the cathode compartment, and wherein said electrolytic cell has high current efficiency and comprises anode and cathode compartments partitioned by a cation exchange fluoropolymer membrane of high mechanical strength, having integrally laminated layers, consisting essentially of:
   (a) a main layer made of perfluorocarbon polymer having carboxylic acid groups as ion exchange groups therefor with an ion exchange capacity of from 1.4 to 2.0 meq/g dry resin and having a thickness of from 50 to 250 μm, (b) a sulfonic acid film surface layer formed on one side of said main layer, made of a perfluorocarbon polymer having sulfonic acid groups as ion exchange groups therefor with an ion exchange capacity of from 0.5 to 1.5 meq/g dry resin and having a thickness of from 5 to 50 μm, (c) a carboxylic acid film surface layer formed on the other side of said main layer, made of a perfluorocarbon polymer having carboxylic acid groups as ion exchange groups therefor with an ion exchange capacity of from 0.5 to 1.3 meq/g dry resin and having a thickness of from 5 to 50 μm, said sulfonic acid film surface layer and carboxylic acid film surface layer constituting the outer-most layers, respectively, and (d) a composite film layer between said main layer and said sulfonic acid film surface layer, to integrally laminate said layers, said composite film layer being made of a perfluorocarbon polymer having both carboxylic acid and sulfonic acid groups and having a thickness of from 5 to 50 μm.

9. The cation exchange fluoropolymer membrane according to claim 1, wherein said main layer of perfluorocarbon polymer has an ion exchange capacity of from 1.4 to 1.9 meq/g dry resin and has a thickness of from 100 to 200 μm.

10. The cation exchange fluoropolymer membrane according to claim 1, wherein said main layer has a thickness which is at least one-half of the total membrane thickness.

11. The cation exchange fluoropolymer membrane according to claim 25, wherein said carboxylic acid film surface layer has an ion-exchange capacity of from 0.8 to 1.3 meq/g dry resin and has a thickness of from 10 to 40 μm.

12. The cation exchange fluoropolymer membrane according to claim 1, wherein said sulfonic acid film surface layer has an ion-exchange capacity of from 0.8 to 1.3 meq/g dry resin and has a thickness of from 10 to 40 μm.

13. The cation exchange fluoropolymer membrane according to claim 1, wherein said perfluorocarbon polymers are selected from the group consisting of

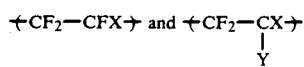

pps wherein X is F or —CF$_3$, and Y is selected from the group consisting of:

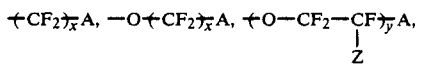

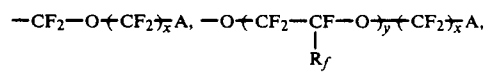

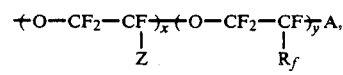

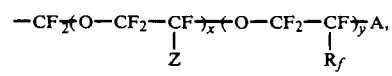

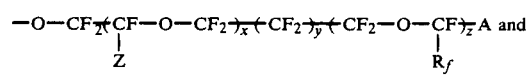

wherein each of x, y and z is from 0 to 10, and each of Z and R$_f$ is —F or a perfluoroalkyl group having from 1 to 10 carbon atoms, A is —SO$_3$M or —COOM, or a group capable of being converted to one of these groups by hydrolysis and selected from th group consisting of —SO$_2$F, —CN, —COF and —COOR, wherein M is H or an alkali metal, and R is an alkyl group having from 1 to 10 carbon atoms.

14. The cation exchange fluoropolymer membrane according to claim 1, wherein said membrane has a total thickness of from 60 to 350 μm.

15. The cation exchange fluoropolymer membrane according to claim 1, which further comprises either a reinforcing woven fabric of a cloth or a net, or a nonwoven fabric of metallic mesh, perforated sheet or polytetrafluoroethylene.

16. The electrolytic cell according to claim 5, wherein said anode is made of a platinum group metal or an electro-conductive oxide or electro-conductive reduced oxide thereof.

17. The electrolytic cell according to claim 16, wherein said metal is selected from the group consisting of platinum, rhodium, ruthenium, palladium and iridium.

18. The electrolytic cell according to claim 5, wherein said cathode is made of a platinum group metal, an electro-conductive oxide thereof, or an iron group metal.

19. THe electrolytic cell according to claim 18, wherein said platinum group metal is selected from the group consisting of platinum, rhodium, ruthenium, palladium an iridium; and said iron group metal is selected from the group consisting of iron, cobalt, nickel, Raney nickel, stabilized Raney nickel, stainless steel, and alkali-etching stainless steel.

* * * * *